Jan. 14, 1936.     G. BROULHIET     2,027,898
RIGID MOTOR CAR FRAME
Filed Nov. 24, 1931     4 Sheets-Sheet 1
Fig.1
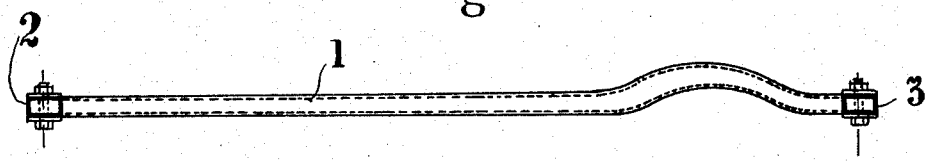
Fig.2
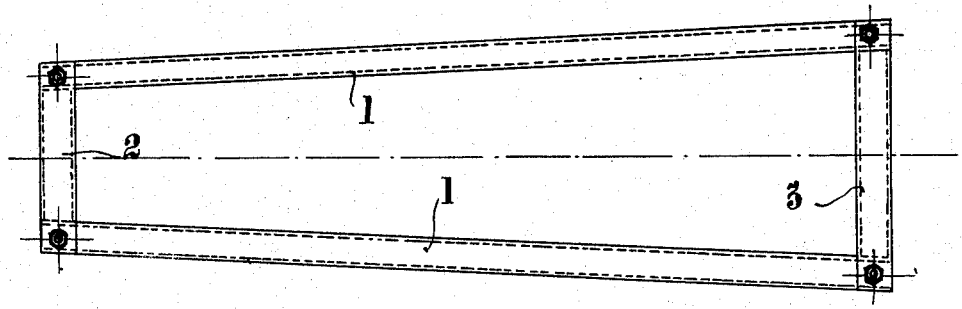
Fig.3ª    Fig.3ᵇ    Fig.3ᶜ    Fig.3ᵈ    Fig.3ᵉ
    
Fig.5            Fig.6
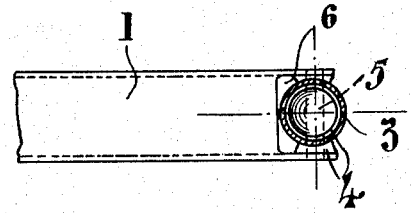 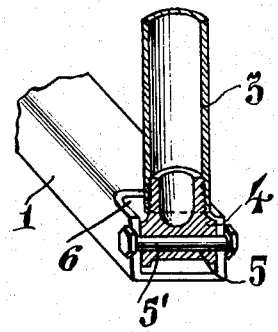
Fig.7
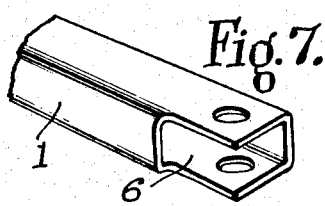
Inventor.
Georges Broulhiet.
By Sommers & Young
attys.

Jan. 14, 1936.　　　G. BROULHIET　　　2,027,898
RIGID MOTOR CAR FRAME
Filed Nov. 24, 1931　　　4 Sheets-Sheet 2
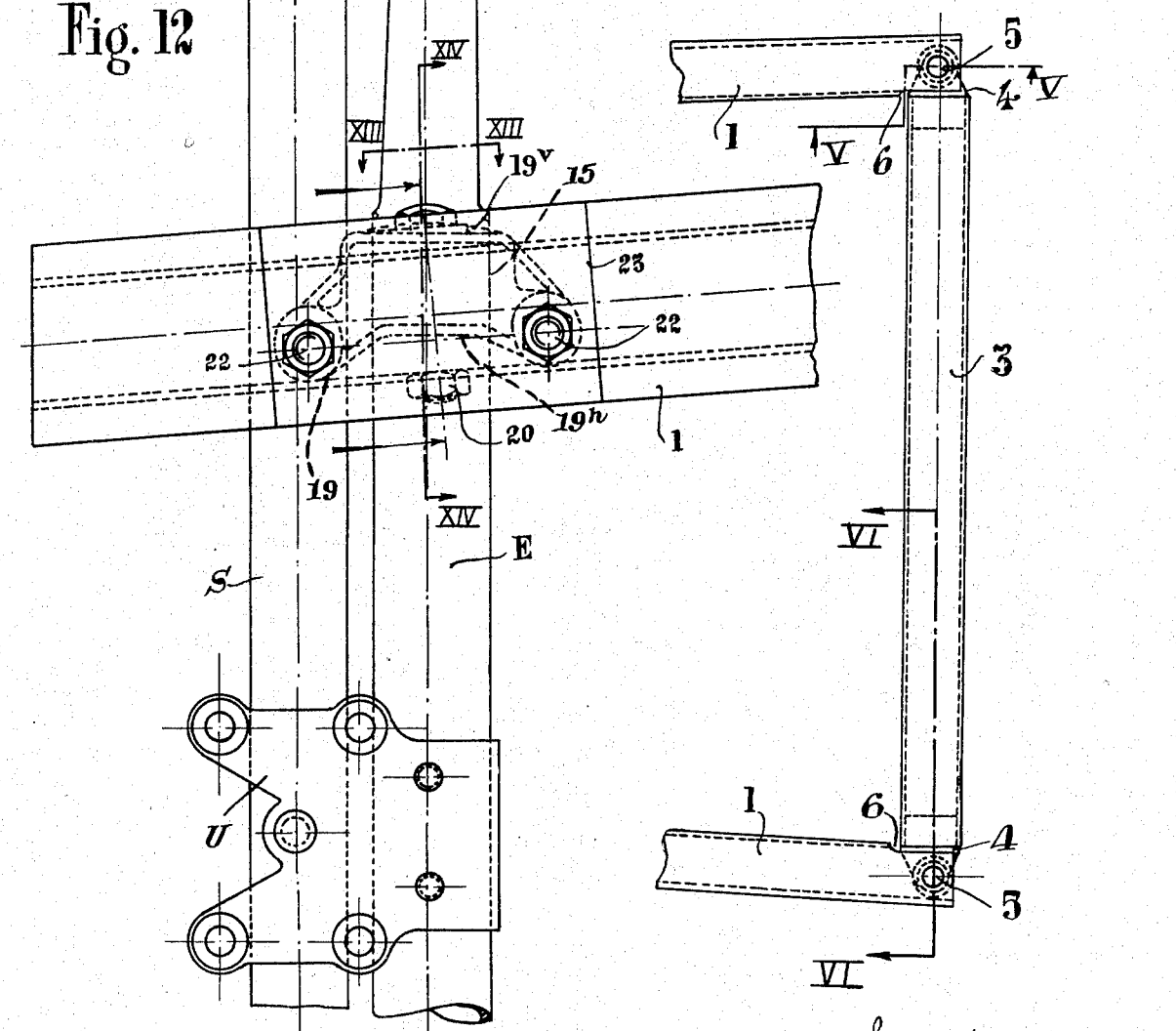

Jan. 14, 1936.   G. BROULHIET   2,027,898
RIGID MOTOR CAR FRAME
Filed Nov. 24, 1931   4 Sheets-Sheet 3

Inventor
Georges Broulhiet
By Sommers & Young attys.

Jan. 14, 1936.                G. BROULHIET                2,027,898
                           RIGID MOTOR CAR FRAME
                          Filed Nov. 24, 1931          4 Sheets-Sheet 4

Inventor
Georges Broulhiet
By Sommers & Young
Attys

Patented Jan. 14, 1936

2,027,898

UNITED STATES PATENT OFFICE 2,027,898

RIGID MOTOR CAR FRAME

Georges Broulhiet, Paris, France

Application November 24, 1931, Serial No. 577,126

4 Claims. (Cl. 280—106)

My invention relates to a motor car frame made of tubular elements assembled by means of bolts which connect together end pieces capable of resisting torsional stress.

The frame according to my invention is formed by a four sided polygon; two longitudinal bearers, a front transverse member and a back transverse member. Each of these four members taken separately is a tubular part which is consequently rigid against twisting.

The said tubular parts may be of any desired shape in section, that is, circular, square or rectangular. The tubes are drawn or welded or they may be made of pressed parts which are subsequently riveted or welded by the autogenous welding process, by the electric arc, by electric soldering or the like.

All said members are provided at their extremities with an end or stiffening part capable of transmitting the maximum torsional stress to which it is capable of resisting, to one or more bolts having a large diameter that constitute the mutual locking of the assembled parts.

The appended drawings show by way of example a mode of execution of a frame constructed according to the present invention, as well as various types of tubular elements which may be employed for its constitution.

Figs. 1 and 2 are diagrams showing the frame in a longitudinal sectional and a plan view.

Figs. 3a through 3e show cross sections of tubular parts of various shapes which may be used in the construction of the frame.

Fig. 4 is a plan view of a back cross member and its connections with the ends of the longitudinal members.

Fig. 5 is an inside side view taken along line V—V of Fig. 4.

Fig. 6 is a perspective view showing the connection of the longitudinal and transverse members and showing in fragmentary sectional view transverse member along line VI—VI of Fig. 4.

Fig. 7 is a perspective sectional view of an end of a longitudinal frame member.

Fig. 12 is a plan view showing the arrangement of an axle serving as front cross member in the case of a vehicle with independent wheels.

Figure 8:
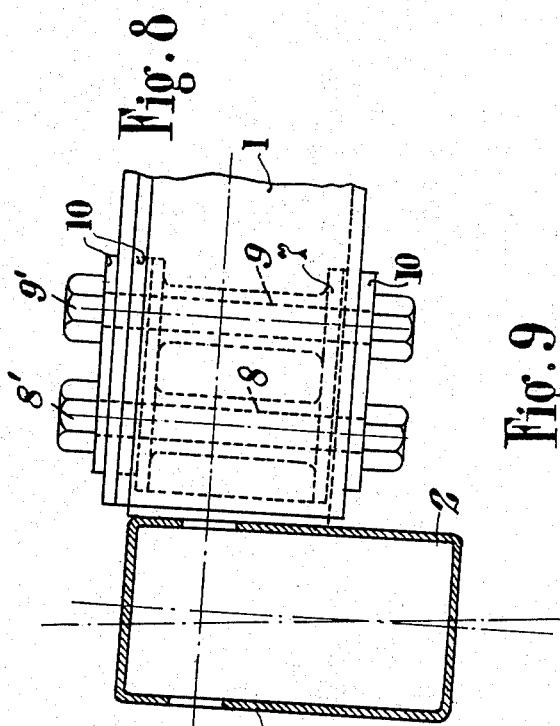
Figs. 8 and 9 show, in front view (partly in section) and horizontal section respectively, the connection of a front cross member with a longitudinal bearer.

As will be seen in the drawings, the frame comprises two symmetrical longitudinal bearers 1, a front cross member 2 and a back cross member 3.

Said members may be made of circular or rectangular shaped tubes, as shown by Figs. 3a and 3b, which are drawn or welded.

They may also be composed of pressed parts (see Figs 3c, 3d, and 3e) which are welded or riveted together.

The cross members may be provided with axial male end parts 4 (in the case illustrated in Figs. 4 to 6) provided with an eye 5, the longitudinal bearer being in the shape of a fork with an opening 6 which acts as a female end part (Fig. 7). A connecting bolt 5' which passes through the eye and the fork transmits the torsional stress from the cross member to the longitudinal bearer and reciprocally.

Figure 9:
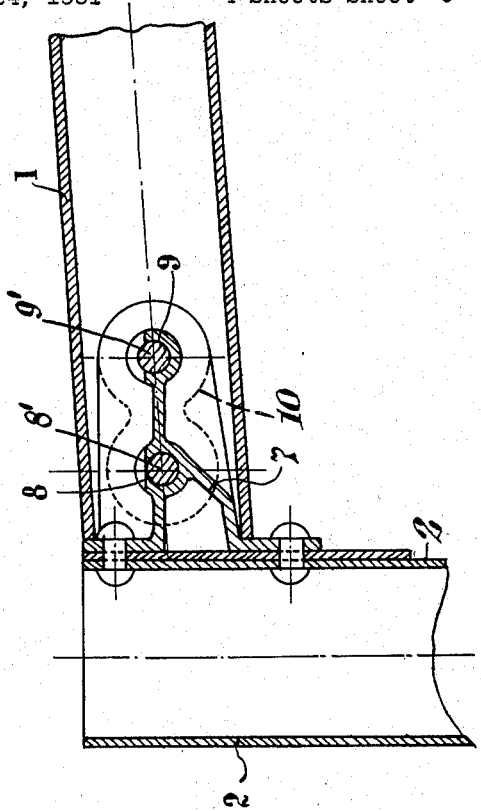

In an alternate construction (Figs. 8 and 9) the cross member 2 may be provided with a perpendicular male end piece 7, provided with eyes, 8, 9 through which pass bolts 8' and 9' passing also through the longitudinal bearer 1 which acts as a female end part and engages the end piece and is reinforced by means of small plates 10.

Figure 10:
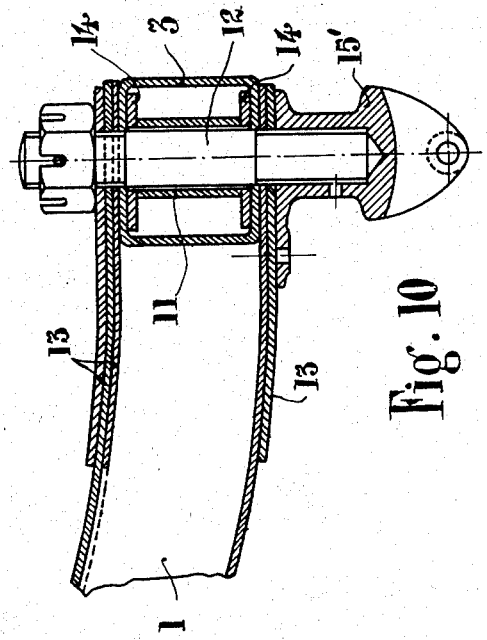
Figs. 10 and 11 are a sectional view and a plan view respectively showing the mode of assembling of another type of back cross member with a longitudinal bearer.
Figure 11:
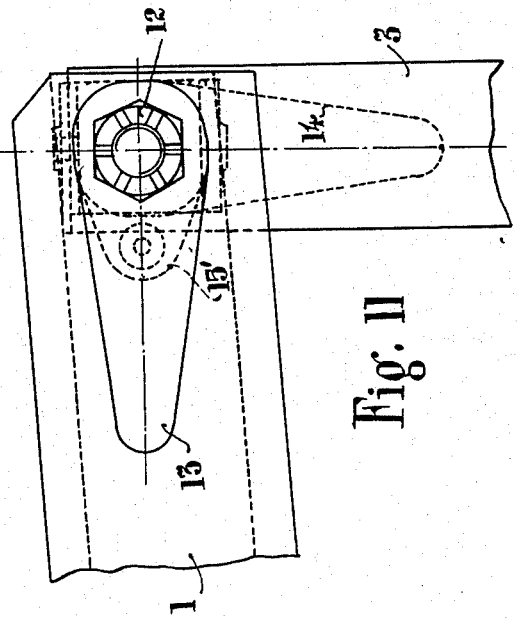

As shown in Fig. 10 a tubular tie 11 designed to bear the tightening stress of the assembling bolt 12 may be secured in the cross member 3. The longitudinal bearer of the type shown in Fig. 3d is moreover reinforced by means of plates 13 and the cross member by means of inner plates 14 between which the tubular tie 11 is placed. The plates 14 are made in one with the parts upon which they are placed by riveting or electrical welding. It is to be noted that the frame members 1 and 3 interengage so that the exterior flat top and bottom surfaces of the member 3 fit closely within the flat top and bottom interior surfaces of the member 1.

In all cases the assembling bolts may be utilized for securing the parts of the carriage to be connected to the frame.

Thus in Fig. 10 for example, the bolt 12 is embedded at the bottom in the back spring support 15' at the back of the vehicle.

In the case of a vehicle provided with so-called independent wheels, that is to say when the axle is rigidly secured upon the frame, the axle itself may replace either the back or the front cross member.

Figure 14:
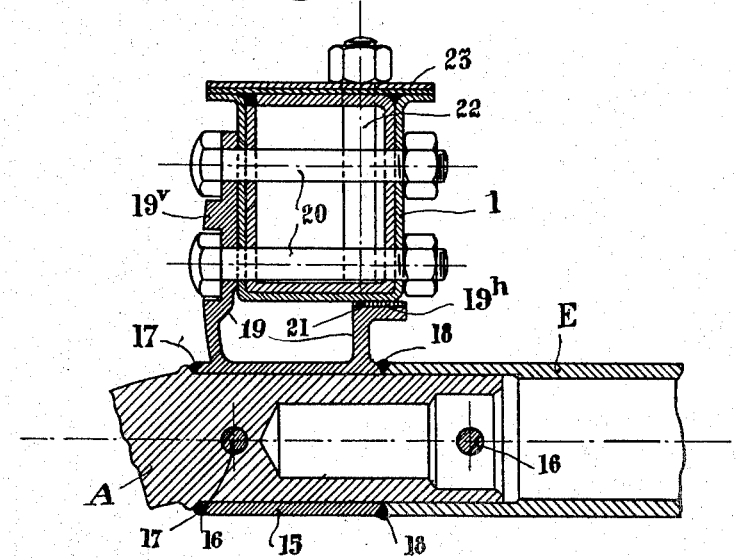
Fig. 14 is a transverse vertical sectional view of same on line XIV—XIV of Fig. 12.
Figure 13:
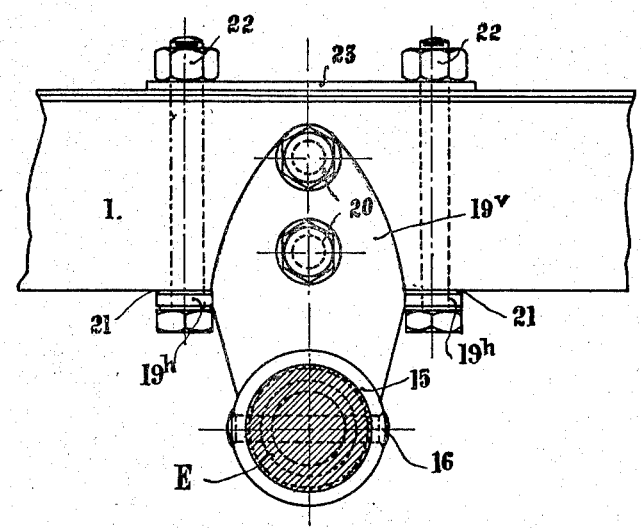
Fig. 13 is a view partly in section on line XIII—XIII of Fig. 12 on a larger scale of the frame connection.

Figs. 12 to 14 show an arrangement in which the axle serves as front cross member.

The axle E is fitted with wheel supporting brackets A which extend outside of the frame as shown in Fig. 12. The parts E and A are solidly connected together by means of a tubular sleeve 15. These parts are further secured by means of pins at 16 which extend through the parts E and A and through the part A and the sleeve 15. This sleeve is directly connected with the axle members A and E by means of welding collars 17, 18, Fig. 14. The sleeve 15 is made integral with a sort of angle bracket 19 which bears by its long vertical side 19ᵛ upon the outer longitudinal wall of the longitudinal bearer 1 to which it is connected by means of two horizontal bolts 20 placed one above the other, the short horizontal side 19ʰ of the bracket extending under the lower surface of the longitudinal bearer; a packing 21 is interposed at that point and the parts in presence are connected by means of vertical bolts 22. A reinforcing plate 23 is also provided upon the upper surface of the longitudinal bearer. The end of the axle member A carries on its end a vertical pin B from which a wheel suspension mechanism is slung. Attached to the central part of the axle E is a bracket U which supports a spring S. Suitable connections between the end of the spring and the wheel mounting may be made. The position of a wheel is shown diagrammatically at C in Fig. 12.

In this mode of execution the torsional stresses are totally transmitted from one element of the frame to the other.

In all cases every one of the four tubular parts constituting the frame will end in a stiffening or end piece capable of transmitting the torsional stress to one or all the locking bolts.

The frame thus put together is the equivalent of a tubular part forming a belt in which the torque opposing the torsional stresses is continuous upon the whole perimeter.

What I claim and desire to secure by Letters Patent of the United States is:

1. A motor car frame which comprises two tubular longitudinal bearers, a tubular back cross member, a tubular front axle constituting the front cross member of the frame, the tubular back cross member being connected with each longitudinal bearer by penetrating into said longitudinal bearer, and the tubular front axle which constitutes the front cross member being connected with each longitudinal bearer by a tubular sleeve engaged upon said front cross member and provided with fittings secured to the said longitudinal bearer, and bolts rigidly connecting together the said sleeve with the front cross member and with the forward end of the longitudinal bearer.

2. A frame for automobiles, consisting of two tubular longitudinal frame members and two tubular transverse frame members for connecting the longitudinal members with each other adjacent their ends, and means for joining the transverse and longitudinal members, the ends of the transverse and longitudinal members being so formed that the end of one member extends into and lies with its upper and lower exterior surface flat against the upper and lower interior surface of the end of the other member, said joining means comprising bolts which extend vertically completely through the interextending portions of said members, said means being of such strength and holding the members so rigidly against relative movement as to transmit from member to member the largest torsional stresses which arise in the operation of the automobile, whereby the complete frame is equivalent to a tube-like ring which can resist at all places the largest torsional stresses.

3. A frame for automobiles, consisting of two tubular longitudinal frame members and two tubular transverse frame members for connecting the longitudinal members with each other adjacent their ends, and means for joining the transverse and longitudinal members, the ends of the transverse and longitudinal members being so formed that the end of one member extends into and lies with its upper and lower exterior surface flat against the upper and lower interior surface of the end of the other member, said joining means comprising bolts which extend completely through the interextending portions of said members, and spacing means arranged within said portions and inside said members to prevent crushing the said members by tightening of said bolts, said means being of such strength and holding the members so rigidly against relative movement as to transmit from member to member the largest torsional stresses which arise in the operation of the automobile, whereby the complete frame is equivalent to a tube-like ring which can resist at all places the largest torsional stresses.

4. A frame for automobiles, consisting of two tubular longitudinal frame members and two tubular transverse frame members for connecting the longitudinal members with each other adjacent their ends, and means for joining the transverse and longitudinal members, the ends of the transverse and longitudinal members being so formed that the end of one member extends into and lies with its upper and lower exterior surface flat against the upper and lower interior surface of the end of the other member, said joining means comprising bolts which extend vertically completely through the interextending portions of said members, said means being of such strength and holding the members so rigidly against relative movement as to transmit from member to member the largest torsional stresses which arise in the operation of the automobile, whereby the complete frame is equivalent to a tube-like ring which can resist at all places the largest torsional stresses, one of said transverse members constituting an axle, the ends of said axle extending laterally outside of the confines of said frame and being rigidly fixed to said axle.

GEORGES BROULHIET.